Sept. 4, 1934.  J. A. SPENCER  1,972,172
SNAP ACTING DEVICE
Filed Jan. 26, 1933  2 Sheets-Sheet 1

John A. Spencer,
Inventor,
Delos G. Haynes,
Attorney.

Sept. 4, 1934.  J. A. SPENCER  1,972,172
SNAP ACTING DEVICE
Filed Jan. 26, 1933  2 Sheets-Sheet 2

John A. Spencer,
Inventor,
Delos F. Haynes
Attorney.

Patented Sept. 4, 1934

1,972,172

UNITED STATES PATENT OFFICE 1,972,172

SNAP-ACTING DEVICE

John A. Spencer, Newtonville, Mass., assignor to General Plate Company, Attleboro, Mass., a corporation of Massachusetts Application January 26, 1933, Serial No. 653,702

11 Claims. (Cl. 74—14)

This invention relates to snap-acting devices, and with regard to certain more specific features, to snap-acting devices adapted for use as an over-centering element in mechanical assemblies.

Among the several objects of the invention may be noted the provision of a snap-acting device of the class indicated which has two positions of stability, between which positions it passes, when suitably actuated, with a snap action; one of said positions of stability, however, being the normal position of the device to which it automatically returns under all circumstances when not forcibly held in the other position of comparative stability; the provision of a snap-acting device of the class described which has an increased throw, or extent of travel between its positions of stability; and the provision of a snap-acting device of the class described which is comparatively simple in construction, and which is durable and reliable in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a plan view of a snap-acting device embodying the present invention;

Similar reference characters indicate corresponding parts throughout the several views of the drawings.

In my Patents Numbers 1,895,590 and 1,895,591, both dated January 31, 1933 (and hence co-pending with this application), both for "Snap-acting devices", I have shown and claimed devices (hereinafter called the "patented devices"), which have certain features in common with the present invention. The patented devices comprise, generally speaking, radially corrugated discs which are originally provided with a slight frusto-conical conformation. These discs, when suitably actuated (either mechanically, in case the disc is monometallic, or thermally, in case the disc is composite or "thermostatic" metallic), reverse the order of their conical conformation with a "snap" action, and come to rest conical in the opposite direction. That is, if the disc were originally in a horizontal plane with its apex up, after snapping it would still be in the horizontal position but with its apex down instead. The feature of these patented discs which primarily distinguishes them from the present invention is that they are perfectly stable in either of their positions; that is to say, if the monometallic patented discs are manually snapped over to their apex-down position, and the manual forces are then removed, the discs will remain stable in the apex-down position until they are reactuated manually to apex-up position. In the present invention, in contradistinction, the device has only one position in which the forces motivating it can be removed and the device remain stable, for if the device be in its other position, and the forces are removed, it will automatically, under its own power, return with the desired "snap" action to its first position.

For purposes of clarity, the terms "position of absolute stability" will be used hereinafter to denote a position in which the device will remain without any application of exterior forces. Similarly, the terms "position of comparative stability" will be used hereinafter to denote a position in which the device will remain when a certain minimum external force is maintained on it. Since these definitions are somewhat arbitrary, they are not to be considered as accurately descriptive, but rather as indicative only. Using the definitions thus established, the patented devices may be characterized as having two "positions of absolute stability", while the devices of the present invention have one "position of absolute stability" and one "position of comparative stability".

Figure 1:
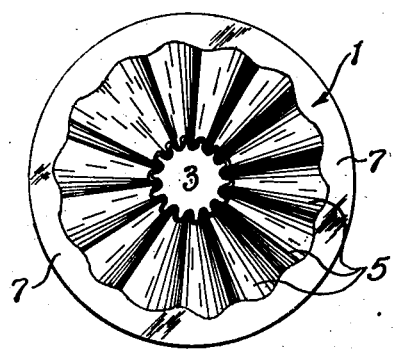
Figure 2:
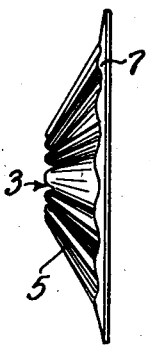
Fig. 2 is an elevation of the device of Fig. 1, showing said device in one of its positions of stability.
Figure 3:
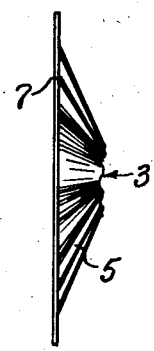
Fig. 3 is an elevation similar to Fig. 2, showing the device in its second position of stability.

Referring now more particularly to the drawings, Figs. 1, 2 and 3 show a snap-acting device analogous to the device shown in my said Patent No. 1,895,591. This may be called the preferred embodiment of the present invention. It comprises a disc 1 made preferably from some resilient or springy sheet metal, such as steel or spring brass or the like, having a central opening 3 and radiating corrugations 5 running from said central opening outwardly nearly to the periphery of the disc. However, the corrugations 5 end leaving sufficient room for a peripheral region 7 of the disc 1 which is uncorrugated, or substantially flat. As shown in Fig. 2 (which represents the position of absolute stability of the disc), the disc is initially formed so that it is frusto-conical, the central portion surrounding the opening 3 being in a plane displaced from the plane of the peripheral portion represented by the region 7. Thus far described, the disc does not essentially differ from the disc of my said Patent No. 1,895,591. The disc of the present invention, however, differs from the said patented disc in that it is stressed in its direction of absolute stability to such an extent that it always returns to said position. This characteristic of the disc is imparted to it as an incident of its manufacture, and may be described as follows: The discs of the present invention, as well as the patented discs, are usually made from blanks initially in the form of cylinders. First, these cylinders are corrugated, the corrugations running parallel to the axis of the cylinder. One edge of the cylinder is then turned inwardly, and by slow stages, the cylinder is gradually capsized into a cone, the corrugations of the in-turned edge being compressed to form the inner periphery, and the corrugations of the other edge being expanded to form the outer periphery. The details of this method of manufacture are set forth more in detail in my copending application, Serial No. 653,701, filed January 26, 1933, for Method of manufacturing radially corrugated discs which is itself a division of my said Patent No. 1,895,590. The disc is thus brought into conical conformation, and appears quite like Fig. 5 of the present drawings. However, the internal strains in the disc incident to its manufacture are sufficient so that this conical position is the only one of absolute stability (the inverse position tending always to return to the original position). Generally, this disc thus constitutes the present invention, as distinguished from the patented invention. However, it is desirable, from the calibration standpoint, to follow a further procedure, so that the force-displacement characteristics of the disc may be more accurately established.

The strains tending always to return the disc to its first position may be minimized by pushing the disc through to its lower position, and the harder it is so pushed, the more the strains are reduced until they begin to build up in the opposite direction. If these strains are reduced to a certain value, but not reversed, and the disc is then heat-treated, they will be further reduced, so that, by experience, it can be determined what amount of internal strains to leave in the disc before its heat treatment to obtain the desired characteristic strains after heat treatment. If the manufacture and heat treatment are designed such that the strains in the disc so treated are zero in either extreme position of the disc, such position will be one of absolute stability, while the opposite extreme position will be one of comparative stability, the disc thus constituting one contemplated by the present invention. By way of distinction, it may be stated that the patented discs are manufactured and heat treated such that the strains are zero at the intermediate position between the two positions of stability, and balanced in both positions of stability. In either case, the instability in the intermediate position is at least in part determined by the structural form of the disc.

Figure 7:
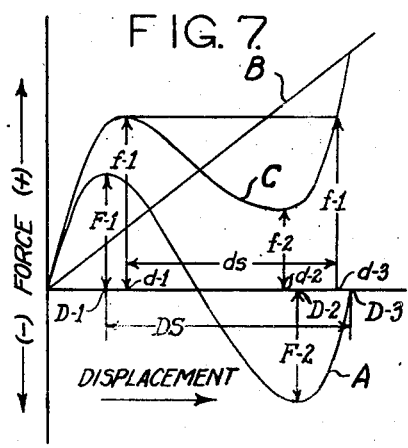
Fig. 7 is a graph showing certain characteristics of the invention.

The difference between the discs of the present invention and the patented discs will be more apparent upon study of the graph appearing as Fig. 7. This graph has been worked out upon the basis of the present knowledge of the mechanical stresses occurring in the discs in question, and is accurate so far as present understanding is concerned. However, the stresses and strains in these discs are exceedingly complicated, and it may well be that the graphs do not accurately represent the features they purport to represent. This possibility does not militate against their usefulness in a descriptive sense.

Fig. 7 has been laid out in such a manner that the ordinates represent externally applied forces, and the abscissae represent displacements. Forces are considered as positive or negative according to the direction in which they are exerted, positive, for present purposes, being the direction in which the force is applied to move the disc of the present invention from its position of absolute stability to its position of comparative stability (from left to right in Fig. 2, for example). Displacements are considered as the extent of motion of the central part of the discs from their position of absolute stability, and are thus all positive. The point of origin, accordingly, represents the location of any disc when in its position of absolute stability (cf. definitions).

Curve A represents the action of one of the patented discs. From its first position of absolute stability (the origin in the graph) its conduct is determined as follows: An increasing positive force is at first applied, the device functioning substantially as an ordinary spring with the displacement increasing proportionately to the applied force. However, a force (F—1) is soon reached at which the curve reverses, and, since the applied force necessary to effect further displacement is less than the force being applied in actuality (F—1), the disc commences to move at a rapid rate. This the "snapping" portion of the action. The force required to further displace the disc is now constantly decreasing, in inverse proportion to the displacement, and is thus contrary in action to the ordinary spring. This continues past the point where the force is zero, and into the region where the force becomes negative (a negative force being understandable as one that would have to be exerted in a direction opposite to that force originally applied in order to prevent the disc from further moving under its own power). This negative force reaches a maximum at F—2, and from there it decreases until the force is again zero, and the disc is located in its second position of absolute stability. Thus, the disc, after once being subjected to a force of (positive) F—1, will, unless said force is removed or another opposing force is set up, snap clear from the displacement D—1 corresponding to the force F—1 to its second position of absolute stability. This displacement during snapping is represented by the designation DS on the graph.

Upon the return snap (from second position of absolute stability to first position of absolute stability) the situation is reversed, it being necessary to apply the negative force F—2 to move the disc to its position of corresponding displacement D—2, after which it snaps clear to its first position of absolute stability.

It may now be assumed that the disc of the present invention differs from the patented disc only in the presence of the initial stress described.

The disc of the present invention will accordingly have all of the curve-characteristics of the patented disc, plus those due to the initial stress. The initial stress, it has been found, has the characteristic action of a superposed ordinary spring; that is, it is in effect a spring which is at rest when the disc is in its position of absolute stability, and which opposes, by the known laws of spring reactions, any displacement of the disc toward its position of comparative stability. Thus it may be plotted on the graph as a straight line B, showing a normal increased displacement with increased force. The characteristic curve of the disc of the present invention may now be plotted as a summation of the curves A and B, shown as C on the graph. Considering, now, this curve C:

The disc at first behaves as did the disc of curve A; that is, the displacement increases with the force. Soon the force achieves a value $f$—1, which is greater than the corresponding force $F$—1 on curve A, and which force ($f$—1) is at a maximum located by a displacement $d$—1 on the curve C. The next instant, providing the force $f$—1 is maintained, the disc commences to move more quickly, passing into the "snap" region of its curve. The maintenance of the force on the disc involves separate considerations, which will be treated hereinafter, but for the present it will be assumed that the force value represented by $f$—1 is maintained on the disc throughout its further displacement. Displacement continues along the curve C, since the force ($f$—1) is always in excess of that required, in a rapid manner. At a displacement $d$—2 the curve C passes through a minimum, representing a force $f$—2 which is the minimum force value that will hold the disc in its extended displacement position. However, since the force $f$—1 is still being applied to the disc, it passes on through the minimum and along the increasing-force portion of the curve C, finally stopping at a point represented by a displacement $d$—3 and the intersection of the force $f$—1 with the curve C. The displacement from $d$—1 to $d$—3 has been with a snap movement, and this is accordingly designated as "$ds$" in the graph.

Consider now, that the force applied to the disc ($f$—1) and holding it in its reversed position of curvature at the displacement $d$—3, slowly decreases in value. As the decrease progresses, the displacement likewise decreases, the action being slow and regulated, along the curve C. However, the minimum force $f$—2 is soon reached. The instant after the applied force drops below the value $f$—2, it is no longer sufficient to hold the disc in extended position, and the disc passes into a condition of reverse snapping. The disc continues its snap movement through the maximum of curve C and stops only when its displacement is the relatively slight value corresponding to the force $f$—2 on the first slope of curve C. This position, so far as displacement is considered, is practically equivalent to the origin point of the graph, or the position of absolute stability of the disc.

The difference between the patented disc and the disc of the present invention will be apparent from the foregoing. It has been shown that, with the patented disc, the force need be applied only to the extent F—1, after which it may be gradually decreased to zero and the disc will thereafter continue, under its own power, to snap clear to its second position of absolute stability; while with the disc of the present invention, the snap occurs when the force has been built up to a value $f$—1, but a force at least equivalent to $f$—2 must then be maintained on the disc else it will return to its (one and only) position of stability.

From the curves A, B, and C, it will be seen that in order to make a disc of the patented type over into a disc of the type of the present invention, the initial stress must be applied in such measure that the force incident to the stress at a displacement D—2 is greater (in geometric magnitude) than the force F—2 required to maintain the patented disc at said displacement D—2; or, in other words, the ordinate of the stress (curve B) at the displacement corresponding to the minimum point of curve A must be magnitudinally enough greater than the ordinate of said minimum point on curve A to raise said minimum above the axis.

Fig. 2, as has been indicated, shows the position of absolute stability of the Fig. 1 type of disc. Fig. 3 in turn shows the position of comparative stability of the same disc.

Figure 4:
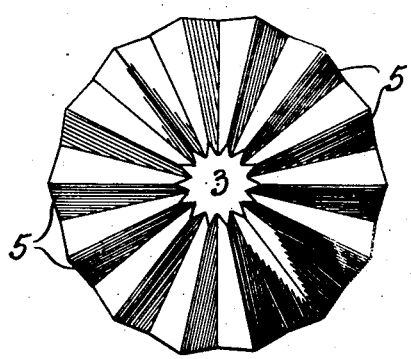
Figs. 4, 5 and 6 are views comparable to Figs. 1, 2, and 3, but illustrating an alternative embodiment of the invention.
Figure 5:
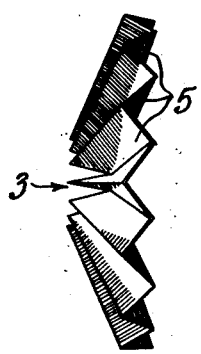
Figure 6:
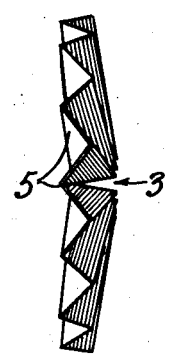

Figs. 4, 5, and 6 show analogous positions (plan, absolute stability, and comparative stability) of a disc made in accordance with the present invention but also corresponding in certain features to the disc of my said Patent No. 1,895,590. The principal difference in the Fig. 4 and Fig. 1 types of discs is the absence, in the Fig. 4 form, of the confining uncorrugated rim 7. The Fig. 4 form of disc is operable and even advantageous in certain circumstances, but the Fig. 1 form is in general preferred, as the non-corrugated rim tends to reduce peripheral expansion at the time of snapping, and thus increase the force of the snap and shorten its duration.

Another difference between the Fig. 1 and Fig. 4 forms of the invention, as shown, is the difference in shape of the corrugations. In Fig. 1, the cross-section of the corrugations shows a circular or curvilinear conformation, while in Fig. 4 the corrugations are sharp-edged. This serves to show that the corrugations may be shaped in any manner within the scope of the invention, the shape of the corrugations, seemingly, having little or no effect so far as the fundamental operating characteristics are concerned.

Figure 8:
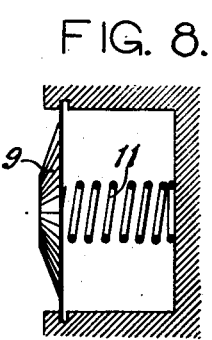
Fig. 8 is a diagrammatic view illustrating another embodiment of the invention.

While the invention as described so far has been concerned particularly with the preferred form in which the disc is itself provided with the initial stress which results in its tendency always to return to one position (in other words, the stress expressed as curve B in the graph, Fig. 7), it will be apparent that the invention also includes a system comprising a patented type disc and a compression spring mounted therewith providing a curve similar to the said curve B, so that the resultant curve of the system is similar to curve C. This system is shown diagrammatically in Fig. 8, in which numeral 9 indicates a patented type disc (either Patent 1,895,590 or Patent 1,895,591) and numeral 11 indicates a compression spring mounted in opposition to the movement of the disc. The form of the compression spring is of little consequence; it may even be replaced by a tension spring mounted on the other side of the disc and providing the same resultant forces and stresses on the disc. In this Fig. 8 embodiment, the disc per se has two positions of absolute stability, but the system comprising the disc and the spring has only one position of absolute stability and an additional position of comparative stability.

The manner of application of the actuating force to the discs of the present invention is a matter worthy of separate consideration. The force must be applied in such a manner that it builds up to a maximum, and thereafter it is at liberty either to maintain or exceed such maximum on the disc throughout its snap displacement (which is a condition difficult to achieve in practice) or to decrease in value, provided it does not decrease faster than the curve C (Fig. 7) itself decreases. One satisfactory method of applying the force is illustrated in Fig. 9, which also serves to illustrate, schematically, a practical embodiment of the invention, namely, a thermally-controlled valve.

Figure 9:
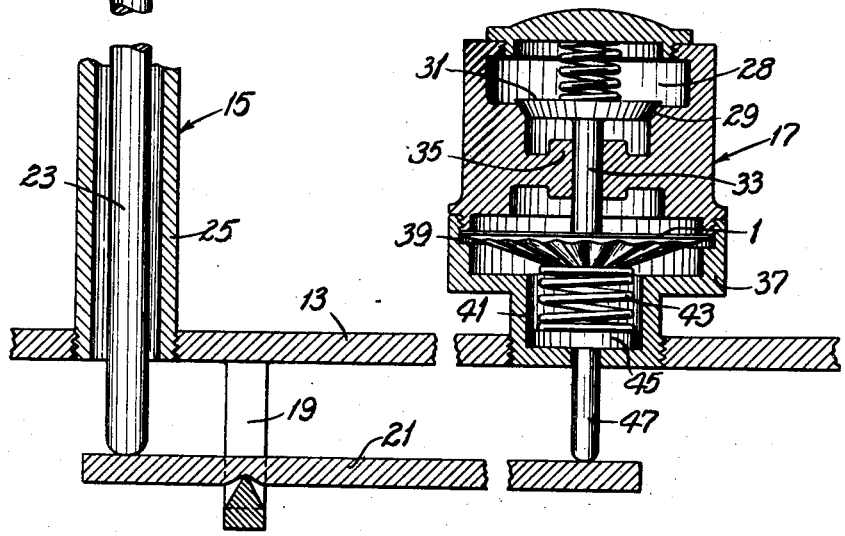
Fig. 9 is a schematic sectional view of a valve control utilizing the present invention; and, Fig. 10 is a graph showing certain further characteristics of the present invention.

Referring now to Fig. 9, numeral 13 indicates a base, upon which are mounted a thermal response mechanism 15, a valve 17, and a fulcrum piece 19 supporting a lever 21 mechanically interconnecting the mechanism 15 and valve 17. The thermal response mechanism comprises a rod 23 and a tube 25 formed of metals having widely varying coefficients of thermal expansion. The rod 23 and tube 25 are joined at their far ends 27, while the near end of the tube 25 is affixed to the base 13 and the near end of the rod 23 is left free for movement. It will readily be seen that with temperature change there is a relative movement between the near end of the rod and tube, which resolves itself into a simple movement of the free rod end since the near tube end is secured to the base 13.

The valve 17 comprises a suitable casing having a valve chamber 28 provided with a valve seat 29 into which fits a valve closure element 31 supported on a stem 33 suitably borne in bearings 35 formed in the casing. The front 37 of the valve casing, which is removable, is provided with an annular groove 39 which receives a disc 1 made in accordance with the present invention. Normally, the valve stem 33 and the disc 1 are connected in such manner that with the disc 1 in its position of absolute stability (as shown in the drawing) the valve closure element 31 is seated in the valve seat 29 to close the valve. Enclosed in a suitable cylindrical projection 41 on the front portion 37 of the valve casing is a compression spring 43, which bears at one end upon the face of disc 1, and at the other end upon the face of a piston-like element 45 which slides freely in the cylinder 41. Projecting from the other side of the element 45 is a pin 47, which passes through a hole in the casing and is thereby available for manipulation from the exterior thereof.

The lever 21 is adjusted to contact the rod end 23, the fulcrum 19, and the pin end 47, in such manner that, say at low temperatures, there is no compression of the spring 43. As the temperature increases, the rod end 23 moves outwardly, reacting upon the lever 21 so that the other end of said lever presses the pin 47 into the casing to compress the spring 43. At this stage, the spring 43 acts merely as a pressure transmitting means, transmitting the pressure of the rod in its increase of length to the disc 1. When the snapping pressure or force of the disc 1 is reached, the spring 43 is considerably compressed, so that, even though the rod ceases to move, the re-expanding spring 43 provides a following force on the disc 1 as it snaps. This may obviously be pre-arranged to the extent that the force originating in the compression spring is always enough to prevent the disc from at once snapping back.

Figure 10:
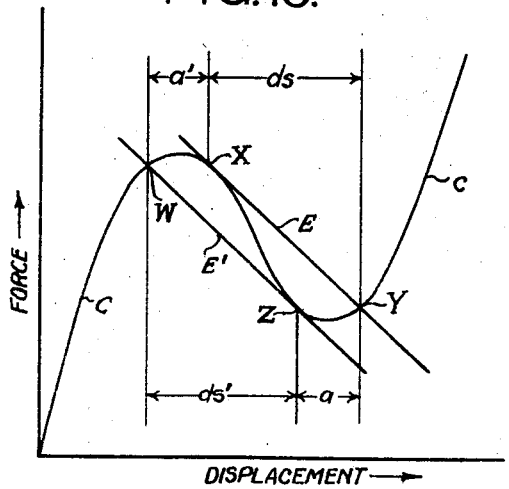

This action is graphically illustrated in Fig. 10, which shows the curve C of Fig. 7 in a few new relationships. The force of the compression spring is shown by the lines E and E', to be explained. When the rod-and-tube combination has built up enough force for the disc to snap, it will be seen that the spring 43 is compressed so that its force and displacement are as represented at point X on the graph. Here the disc is commencing to snap. As the disc snaps, its curve is of course that shown by letter C, but the spring 43, being an ordinary spring, follows straight line E. At a point Y beyond the minimum of curve C, curve C again intersects line E. This represents the termination of the snap of the disc. The total distance of snap, expressed as displacement between points X and Y, is shown as ds. Assume, now, that the temperature decreases, thus decreasing the displacement of the rod end 23 and hence the pressure on the spring 43. This is equivalent to moving the spring bodily away from the disc through a slight displacement to a new position represented by line E' (Fig. 10). This movement, of course, takes place gradually, and as line E shifts to position E', the displacement of the disc slowly decreases until, after a slow or "creep" movement to point Z, through a displacement represented by letter a, the force of the spring 43 is no longer sufficient to hold the disc, and it commences its reverse snap movement. Throughout its reverse snap, however, it is compressing the spring 43 along line E', so that soon a point W is reached which is again on the curve C and which represents the point at which the disc comes to rest (assuming no further movement of the thermostatic means). The distance through which the reverse snap has taken place is represented by ds'.

The cycle now recommences, and as the thermostatic means builds up more pressure, the spring 43 is effectually moved until it again assumes the position represented by line E, the disc, meanwhile, moving slowly from point W back to point X on curve C, through a displacement a'. Thereafter the forward snap takes place in the manner described.

It will be seen that the total forward movement of the disc, represented by the sum of a' (slow movement) and ds (snap movement) is exactly equal to the total reversing movement, represented by the sum of a (slow movement) and ds' (snap movement).

Thus is an effective actuating means provided for the disc of the present invention. It will readily be seen that the rod-and-tube type thermostat could not have been directly applied to the disc as an actuating means, for, although this arrangement would have built up the initial snapping force $f-1$, it would not have provided the follow-up force necessary to cause the snap.

An alternative type, with the same general arrangement, would comprise making the lever 21 of a resilient material and omitting the spring 43, the lever 21 then functioning as the resilient transmitting and follow-up means.

The actuating means for the present type of disc, accordingly, comprises a resilient follower coupled with the primary pressure-applying means, the follower having the property of maintaining a pressure on the disc in excess of that required to move the disc throughout its displacement.

Another method of operating the disc embodying the present invention, which is not dependent upon the presence of a resilient element, comprises simply loading the disc with free moving weights, which will of course follow the disc through its movement without decreasing the force thereby applied. This method, however, does not find ready practical application, on account of its inherent nature.

The present invention finds many uses in practical devices, a few only of which need be enumerated. For example, it finds ready utility in a push-button type of electrical switch, wherein it provides a greatly desired snap making and breaking of contacts, as against the slow, resilient making and breaking of ordinary compression spring types of push button switches. Another use is in connection with valve control, such as is shown in Fig. 9, particularly pilot valve control as the pilot flame valve of a gas range. Here it opens the valve and shuts it quickly and positively, providing an instantaneous gas flow control, in distinction to the slow throttle type control heretofore achieved. Other uses could be described at length, but they are not of importance herein.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A snap-acting device comprising a radially corrugated disc having two positions of stability, one of said positions being characterized as one of "absolute" stability and the other position being characterized as one of "comparative" stability, said device passing between its said positions of stability, when suitably actuated, with a snap action, and said device tending always to return to its position of absolute stability from its position of comparative stability.

2. A snap-acting device comprising a disc of resilient metal having radial corrugations therein, said disc having a frusto-conical conformation and being adapted, upon suitable external actuation, to snap through to an opposite conical conformation, and means associated with said disc tending always to return said disc automatically from its second conical conformation to its initial conical conformation.

3. A snap-acting device comprising a disc of resilient metal having radial corrugations therein, said disc having a frusto-conical conformation and being adapted, upon suitable external actuation, to snap through to an opposite conical conformation, and means associated with said disc tending always to return said disc automatically from its second conical conformation to its initial conical conformation, said last-named means comprising a stress initially placed in said disc.

4. A snap-acting device comprising a disc of resilient metal having radial corrugations therein, said disc having a frusto-conical conformation and being adapted, upon suitable external actuation, to snap through to an opposite conical conformation, and means associated with said disc tending always to return said disc automatically from its second conical conformation to its initial conical conformation, said last-named means comprising spring means mounted exteriorly to the disc and reacting thereon.

5. A snap-acting device comprising a disc of resilient metal provided with radial corrugations therein, said disc having a slightly frusto-conical conformation, said disc being adapted to be actuated to assume a position of opposite conical conformation, and said disc being initially stressed whereby it automatically returns from said position of opposite conical conformation to its initial position.

6. A snap-acting device comprising a disc of resilient metal provided with radial corrugations therein, said disc having a slightly frusto-conical conformation, said disc being adapted to be actuated to assume a position of opposite conical conformation, and said disc being initially stressed whereby it automatically returns from said position of opposite conical conformation to its initial position, said disc having a peripheral region free of said radial corrugations.

7. A snap-acting device comprising a disc of resilient metal, said disc having radial corrugations therein, and being provided with an initial slightly frusto-conical conformation, said disc having a position of absolute stability corresponding to said initial conical conformation and a position of comparative stability corresponding to a conical conformation the reverse of the initial conical conformation, said disc, when suitably actuated, passing between said positions of stability with a snap action.

8. In combination, a snap-acting device and an actuating means therefor, said snap-acting device comprising a radially corrugated disc of resilient material having a position of "absolute" stability and a position of "comparative" stability, said actuating means comprising force-applying means substantially normal to the plane of said disc adapted to apply a maximum force to initiate movement of said disc from said position of "absolute" stability to said position of "comparative" stability and thereafter to apply a force sufficient to prevent said disc from returning, under its own power, from said position of "comparative" stability to said position of "absolute" stability.

9. In combination, a snap-acting device and an actuating means therefor, said snap-acting device comprising a radially corrugated disc of resilient material having a position of "absolute" stability and a position of "comparative" stability, said actuating means comprising moving means, and resilient means transmitting the movement of said moving means to said disc in such manner that the resilient means absorbs the motion of the moving means until a maximum force on the disc is built up, said maximum force being sufficient to initiate movement of said disc from its position of "absolute" stability to its positon of "comparative" stability, said resilient means thereafter providing sufficient force on said disc, independently of further motion of said moving means, to prevent said disc from returning, under its own power, from its position of "comparative" stability to its position of "absolute" stability.

10. The combination as set forth in claim 9 in which the resilient means comprises a compression spring bearing normally on the surface of the disc.

11. The combination as set forth in claim 9 in which the resilient means comprises a leaf spring bearing at one end upon the disc in such manner as to exert a force on the disc normal to its plane.

JOHN A. SPENCER.